G. W. PRIEST.
APPARATUS FOR MANUFACTURING VARNISH FOR COATING LEATHER.
APPLICATION FILED APR. 9, 1909.

971,071.

Patented Sept. 27, 1910.

3 SHEETS—SHEET 1.

G. W. PRIEST.
APPARATUS FOR MANUFACTURING VARNISH FOR COATING LEATHER.
APPLICATION FILED APR. 9, 1909.

971,071.

Patented Sept. 27, 1910.
3 SHEETS—SHEET 3.

Witnesses:
H. B. Davis
Cynthia Doyle

Inventor:
George W. Priest

UNITED STATES PATENT OFFICE.

GEORGE WESLEY PRIEST, OF NEWTON, MASSACHUSETTS, ASSIGNOR TO THE RIVERSIDE JAPANNERY, INC., OF MANSFIELD, MASSACHUSETTS, A CORPORATION OF MASSACHUSETTS.

APPARATUS FOR MANUFACTURING VARNISH FOR COATING LEATHER.

971,071.      Specification of Letters Patent.      Patented Sept. 27, 1910.

Application filed April 9, 1909. Serial No. 488,936.

*To all whom it may concern:*

Be it known that I, GEORGE WESLEY PRIEST, of Newton, county of Middlesex, State of Massachusetts, have invented an Improvement in Apparatus for Manufacturing Varnish for Coating Leather, of which the following is a specification.

This invention relates to an apparatus for producing a composition adapted to be applied to leather for the purpose of coating the same to make what is commonly known in the art as patent leather, or it may be applied as a coating to other materials. The composition is herein composed of linseed-oil, with or without the addition thereto of other ingredients or coloring matter; and my invention has for its object the treatment of the oil whereby the quality of the finished product is greatly improved, and the cost of production materially reduced.

Figure 1:
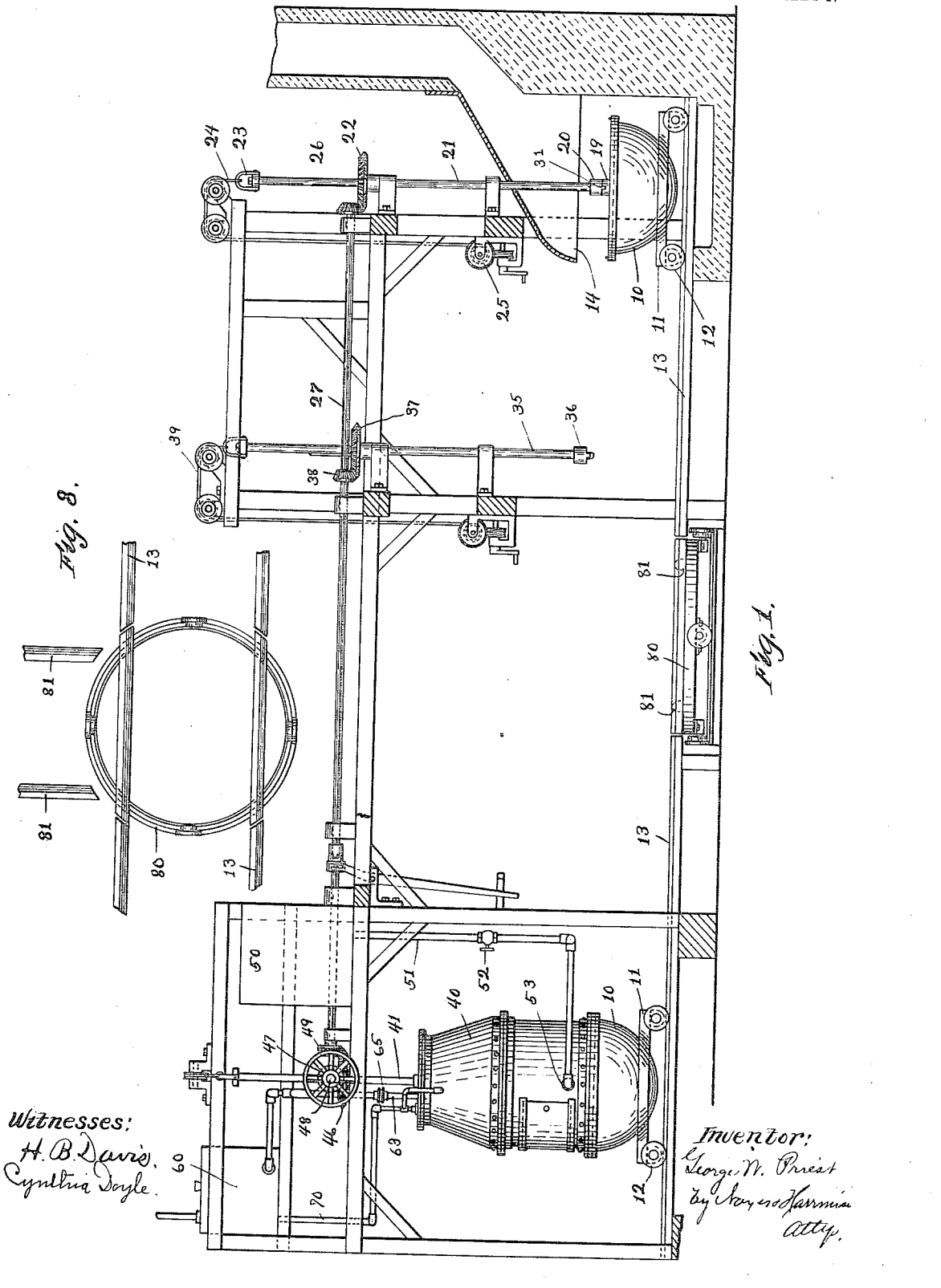
Figure 2:
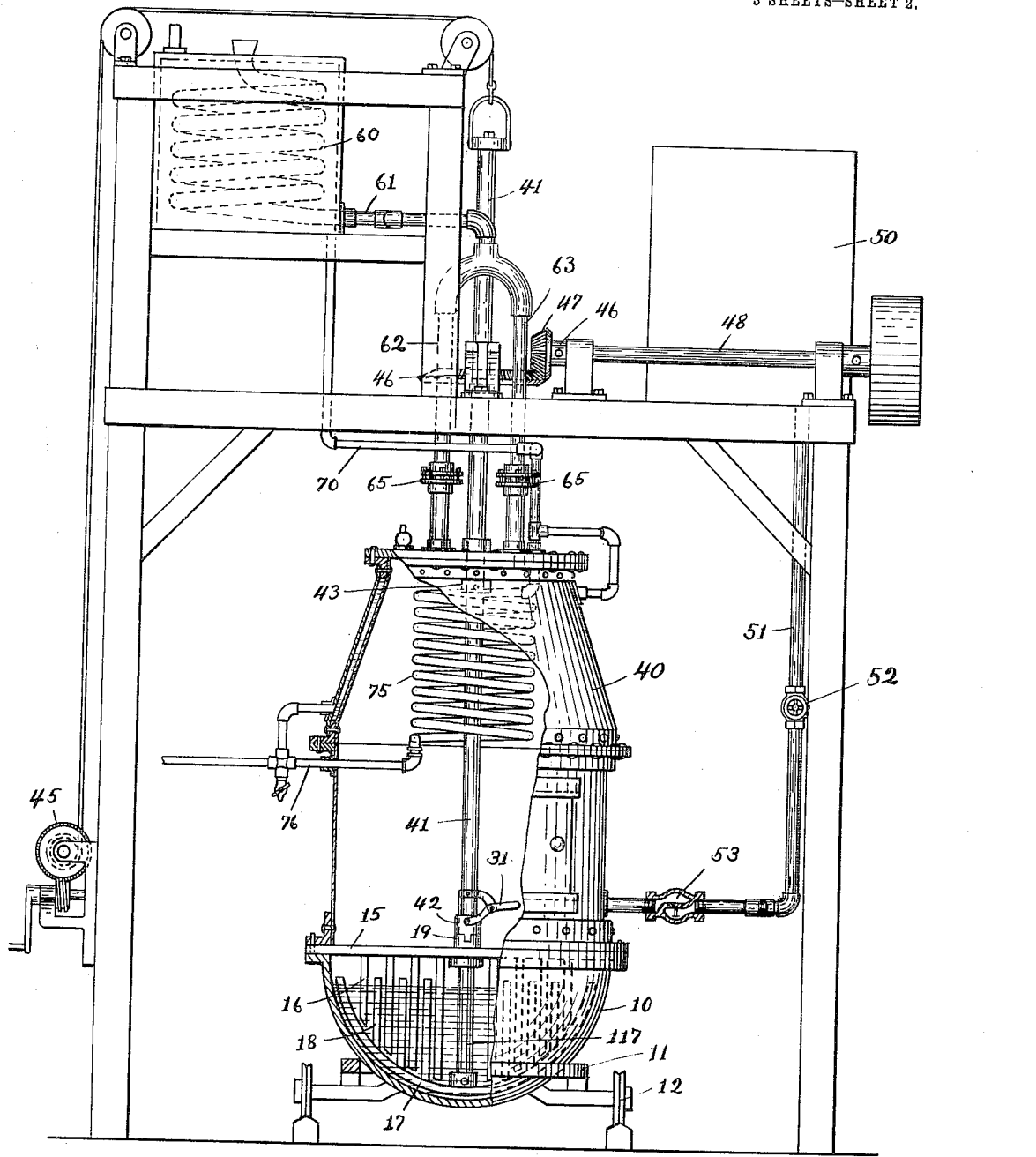
Figure 4:
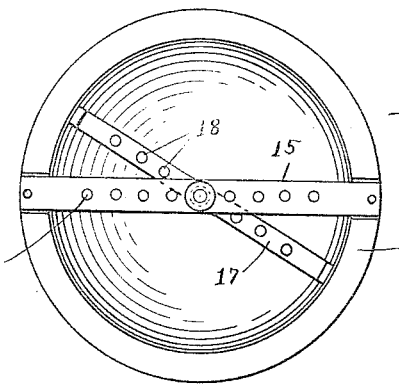
Figure 3:
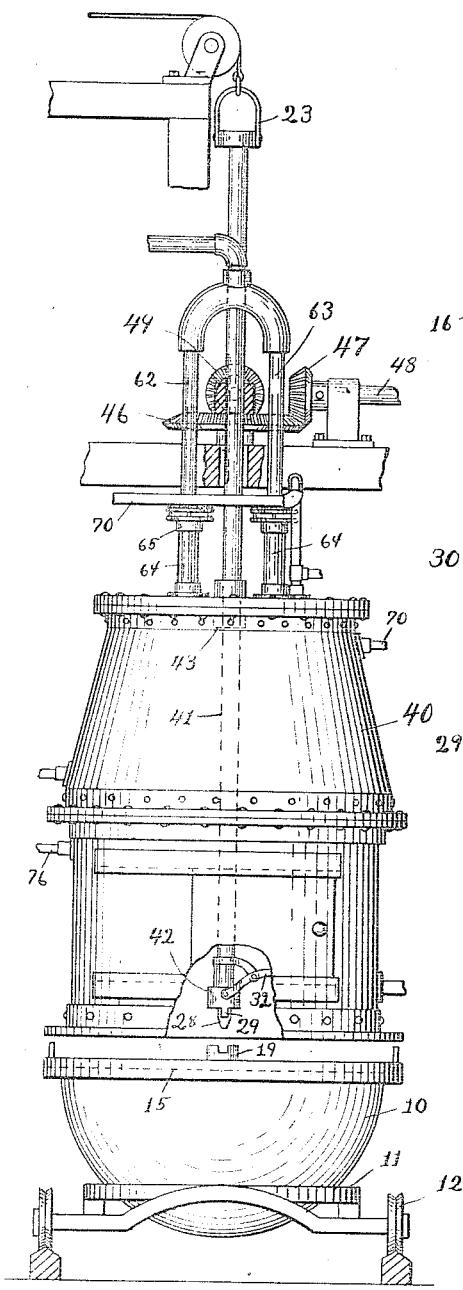
Figures 5, 6:
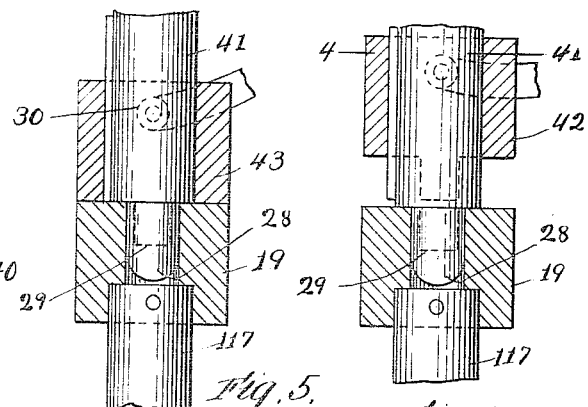
Figures 7, 9:
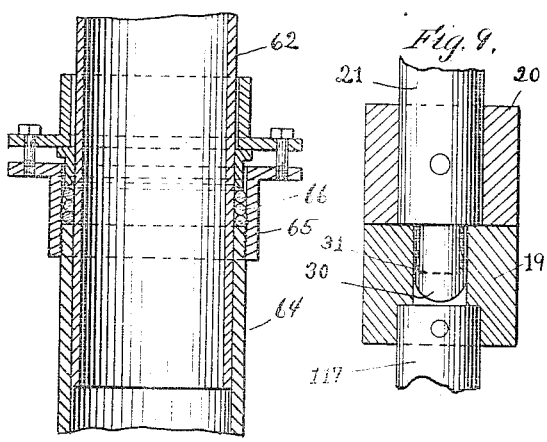

Figure 1 is a front elevation of an apparatus embodying this invention for making a composition to be used for coating leather and other materials. Fig. 2 is a left hand view of a portion of the apparatus shown in Fig. 1, broken away to show the parts within the dome. Fig. 3 is a similar view showing the dome raised above the kettle. Fig. 4 is a plan view of the kettle and stirring-device contained therein. Figs. 5 and 6 are vertical sectional details of the clutch for connecting the stirring-device with the actuating-devices. Fig. 7 is a vertical sectional detail of a sliding joint connection which may be employed. Fig. 8 is a detail showing a spur track on to which the portable kettle may be run to permit another kettle to pass by it. Fig. 9 is a sectional detail of the clutch of one of the actuating-devices for the stirring-device.

10 represents the kettle which is of any suitable shape, size and construction, and 11 a supporting-truck therefor, bearing wheels 12, whereby it is adapted to be moved along on a track 13. The kettle is thus portable.

14 represents a furnace into and out of which the kettle is movable, said furnace being of any suitable construction, and having a side opening provided for the entrance and exit of the kettle and the truck supporting it.

The linseed-oil to be treated is contained in the kettle and is boiled for a long period of time and at a high temperature until it has become solidified to such an extent that it will not readily flow and which upon cooling resembles rubber. To thus boil the oil at the required high temperature the kettle containing it is kept over the fire while the temperature rises from normal, say 50° F. and is then withdrawn and allowed to cool for a short period of time until the temperature falls, say 25° F. It is then returned to the furnace and the temperature again raised, say 50° F. and then again withdrawn and the temperature allowed to drop say 25° F., and so on until a maximum temperature of about 600° F. is attained, and at this temperature it is permitted to boil for a long period of time or at least until the oil has been reduced to a thickened state, when it is ready to be dissolved or reduced by a suitable solvent, such for instance as naphtha, until it is reduced to a very thin state so that when cool it will readily flow and may be flowed on to or otherwise applied to leather or other material.

In carrying out this process the kettle 10 is moved repeatedly into and out of the furnace, by moving the truck along on the track provided for it, and notwithstanding it is large and heavy it may be easily moved along on the track either into and out of the furnace or to any other place desired.

It is very important that the oil shall be stirred continuously while being boiled, and the slower the boiling operation within certain limits and the more thoroughly the oil is stirred the better will be the product. Hence I have herein provided a mechanical stirring-device, which, as shown in Figs. 2 and 4, comprises two stirring-members, movable one with relation to the other. One of said members is stationarily supported on the kettle, and consists of a cross-bar 15 extended diametrically across the top of the kettle and secured at its ends to the opposite sides thereof, and a set of fingers 16, extended downward from said cross-bar which terminate near the bottom of the kettle, being arranged vertical and in parallel with each other and suitably spaced apart. The other member is revoluble, and consists of a curved bar 17, shaped to correspond to the bottom of the kettle, which is placed in the kettle, and is secured to the lower end of a central upright shaft 117 having its bearings in said cross-bar 15, and a set of upwardly extended fingers 18 rising from said curved bar and arranged in parallel and spaced apart to occupy positions between the finger 16 when the two cross-bars occupy the same vertical plane and to pass between said fingers 16 as the cross-bar bearing them is revolved.

The revoluble member of the stirring-device is adapted to be engaged by a suitable actuating-device by which it may be revolved, and said actuating-device is adapted to be detachably connected with said revoluble-member, so that when disconnected therefrom the kettle may be moved along on the track, carrying the stirring-device with it.

As here shown the upper end of the shaft 117 has a clutch-member 19 adapted to be engaged by a clutch-member 20, which, as shown in Fig. 1, is provided at the lower end of an upright-shaft 21, suitably supported by the framework. The shaft 21 is movable longitudinally to engage and disengage the shaft 117, and also is revoluble, so that when in engagement with said shaft 117 the latter may be revolved by it to operate the stirring-device.

The clutch-member 19, as here shown, has a center-hole to receive a projection 30, see Fig. 9, on the end of the clutch-member 20, and also is recessed to receive projections 31, on said clutch-member 20.

The clutch-member 20 may be rigidly secured to the end of the shaft 21, as shown in Fig. 1.

The shaft 21 passes through the hub of a bevel-gear 22, and is provided with means, connected with its upper end, whereby it may be moved longitudinally. As here shown, the upper end of the shaft has a loop 23 to which a cord is connected, which passes over suitable pulleys and is adapted to be wound upon a windlass 25. The shaft 21 has a spline which enters a spline-way in the hub of the bevel-gear 22, and said bevel-gear is engaged by a bevel-pinion 26 secured to a power-driven shaft 27. The shaft 21 extends down through a hole in the top of the furnace so that when the kettle is reposing therein said shaft may be caused to engage the shaft 117 of a stirring-device and operate said stirring-device to stir the contents of the kettle.

When it is desired to withdraw the kettle from the furnace the shaft 21 is raised to disengage the stirring-device. When the kettle is withdrawn from the furnace it is only necessary to move it along on the track but a short distance, where it is permitted to repose for a short period of time, while the temperature falls, but while thus withdrawn it is still desirable to continuously stir the contents thereof, hence another actuating-device, like the actuating-device previously described, is arranged on the framework, which is adapted to be operated to engage and operate the shaft 117 of the stirring-device.

35 represents the upright shaft of said actuating-device which has at its lower end a clutch-member 36 for engagement with the clutch-member 19. Said shaft passes through the hub of the beveled gear 37 which is engaged by a beveled pinion 38, secured to the shaft 27, and said shaft is adapted to be moved longitudinally by a cord 39, which is connected to its upper end and which is adapted to be wound upon a windlass.

The stirring-device here shown and the actuating-devices therefor, illustrate one simple embodiment of this part of my invention, but I desire it to be understood that in lieu thereof other forms of stirring-device may be employed and also other forms of actuating-devices, without departing from the spirit and scope of my invention.

After the oil has been boiled and reduced to the desired consistency and while it is still at its maximum temperature or thereabout, it is dissolved in or diluted by a suitable solvent to produce a thin, easily flowing composition or varnish, which may be readily flowed on to or otherwise applied to the surface of the leather or other material.

As a solvent or diluent I employ naphtha, or some equivalent material, which dissolves the thickened oil and produces a composition of the required consistency. In carrying out this part of my invention the kettle 10 is moved along on the track 13 to a position beneath a dome 40, which is shaped to fit the top of the kettle, and when placed thereon to close said top. Said dome may be of any suitable shape, size and construction, and is adapted to be raised and lowered to disengage and engage the top of the kettle. While the solvent is being added it is necessary to constantly stir the contents of the kettle, and the more it is stirred the better will be the product, hence mechanical means are employed to stir it, and, as here shown, the mechanical stirring-device heretofore described, which is contained in the kettle may be employed, and a suitable actuating-device provided for it, which for convenience may be made like the actuating-devices heretofore described.

41 represents the shaft of the actuating-device which is arranged in the dome. It has a clutch-member 42 arranged on it at its lower end which is adapted to engage the clutch-member 19. Referring to Figs. 5 and 6, said clutch-member is slidably arranged on the shaft, and the shaft has a spline and the clutch-member a spline-way to provide for the sliding movement. The clutch-member has connected to it a forked lever 32 by which it may be raised and lowered on the shaft, said lever being connected with the shaft. The clutch-member has a central projection 28 and side projections 29, adapted to enter correspondingly shaped recesses in the clutch-member. Said shaft 41 extends through the top of the dome, and has fixed to it a collar 43, see dotted lines, at a point below the top of the dome, which, as the shaft is raised by the operation of a windlass 45, to disengage the stirring-shaft 117, will engage the under side of said top-plate and then operate to lift the dome, so that the dome is lifted by the operation of the windlass 45. As the windlass is turned backward the dome and shaft are lowered until the dome engages the top of the kettle, and until the shaft subsequently engages the stirring-device. Said shaft 41 extends through a bevel-gear 46, which is engaged by the bevel-pinion 47, secured to the power-driven shaft 48, and said bevel-gear 46 also engages a bevel-pinion 49 which is secured to the horizontal shaft 27, said shafts and bevel-gears and pinions serving as the operating-mechanism for the actuating-devices for the stirring-device. Naphtha or other solvent contained in a reservoir 50 is conducted to the dome 40, to be delivered to the contents of the kettle, and, as here shown, a pipe 51 leads from the reservoir to the dome which has connected into it a shut-off valve 52, and a back check-valve 53. The solvent is under no considerable pressure, in fact, the head due to the elevation of the reservoir ordinarily being sufficient. As the solvent enters the dome it is mixed with the boiled oil by the action of the stirring-device, the operation continuing while the oil is cooling and until it has become sufficiently thin so that when cool it may be easily flowed onto the surface of the leather. As the temperature of the boiled oil is very high at the beginning of the operation much of the solvent is vaporized, filling the dome, and herein means are provided for condensing the vaporized solvent and for returning it to the dome. In carrying out this part of my invention a condenser of any suitable construction is employed which is herein represented at 60, to which a large pipe is connected, which is connected with the top of the dome, preferably by two or more pipes 62, 63. The condenser comprises a coil of pipe which is open at the top, and the vapor from the dome enters said coil of pipe and while passing therethrough becomes condensed and flows back through the same pipe to the dome. The pipes 62, 63 are arranged to provide for an up and down movement of the dome, and, as shown in Fig. 7, 62 represents one of the pipes and 64 a pipe connected with the dome which receives said pipe 62, and 65 a joint connection connected with the pipe 64 which embraces the pipe 62 and incloses one or more packing rings 66 to form a tight joint. Thus the pipes leading from the dome to the condenser are telescopic.

The reservoir containing the condensing-coil is preferably filled with water. It is also desirable to cool the top part of the dome as much as possible, hence the top part of the dome is made with double walls to provide a space between them, as shown in Fig. 2, and the pipe 70 leads from the reservoir 60 to the top part of the dome so that the water is free to pass through the space provided thereat. Within the dome, at the top part thereof, a cooling-coil 75 is provided, which is also connected with said pipe 70, in order that the water may pass through it and escape by means of a pipe 76.

While the stirring-device is operating to mix the liquid-solvent into the boiled-oil, it also operates to more or less mix the vaporized solvent into the oil which assists in the dissolving action. By employing a dome or equivalent tight cover for the kettle but little if any solvent will be lost during the operation.

I do not desire to limit my invention to the particular means employed for delivering the solvent or to the particular means employed for condensing the solvent or to the particular means employed for cooling the dome, nor to the employment of all of these elements, as it is obvious that many equivalent forms may be made which come within the spirit and scope of my invention.

The track 13 extends from the furnace to the dome or other closing-device for the top of the kettle, so that the portable kettle may be moved from one to the other while the temperature of the contents of the kettle is at the maximum or thereabout, and at an intermediate point along the track a turn-table 80 is arranged, which may be of any suitable construction, and extended at right angles from the track 13 a spur track 81 is provided so that when more than one kettle is being used in carrying out my process for the manufacture of the composition, one kettle may be run out on the spur track to permit the other to pass it.

Having thus described my invention, what I claim as new and desire to secure by Letters Patent is:—

1. In an apparatus of the kind described, a portable kettle, a stirring device for the contents of the kettle which is connected to and movable with the kettle, and a plurality of actuating-devices, any one of which is adapted to engage and operate said stirring-device, substantially as described.

2. In an apparatus of the kind described, a portable kettle adapted to be moved into and out of a furnace, a stirring-device for the contents of the kettle which is connected to and movable with the kettle, and actuating-devices arranged one within and the other outside of the furnace for engaging and operating said stirring-device, substantially as described.

3. In an apparatus of the kind described, a portable kettle adapted to be moved into and out of a furnace, mechanical means having actuating-devices both inside and outside the furnace for continuously stirring the contents of the kettle when in either position, substantially as described.

4. In an apparatus of the kind described, a kettle adapted to be moved into and out of a furnace, a stirring-device contained in the kettle and two actuating-devices for said stirring-device, movable into and out of engagement with said stirring-device and arranged one within and the other outside of the furnace, separate means for moving said actuating-devices into and out of engagement with the stirring-device and for holding the actuating-devices in disengaged position, and means for operating said actuating-devices, substantially as described.

5. In an apparatus of the kind described, a kettle adapted to be moved into and out of a furnace, a stirring-device contained in the kettle having a clutch-member and two actuating-devices, each having a clutch-member adapted to engage the clutch-member on the stirring-device, one located within and the other outside of the furnace, substantially as described.

6. In an apparatus of the kind described, a portable kettle, a dome for closing the top of the kettle which is in open communication therewith, means for stirring the contents of the kettle while closed, means for delivering a liquid solvent thereto while closed and its contents are being stirred, and means for cooling the space within the dome which is in open communication with the kettle, substantially as described.

7. In an apparatus of the kind described, a portable kettle, a dome for closing the top of the kettle which is in open communication therewith, means for holding said dome in suspension and for raising and lowering it to move it into and out of engagement with the kettle, a reservoir containing a liquid solvent which is to be added to the contents of the kettle, and a pipe leading from said reservoir and connected with the dome near its lower end for conducting the liquid solvent to the kettle, substantially as described.

8. In an apparatus of the kind described, a portable kettle, a dome for closing the top of the kettle which is in open communication therewith, means for raising and lowering said dome to move it into and out of engagement with the kettle, a condenser, a support therefor, and a pipe leading from said condenser to the dome, which is constructed and arranged to permit up and down movements of said dome relative to the condenser, substantially as described.

9. In an apparatus of the kind described, a portable kettle, a stirring-device contained therein, a dome for closing the top of the kettle having a door, an actuating-device for said stirring-device having a clutch-member for engaging a clutch-member on the stirring-device, means for supporting said clutch-members, accessible when the door is open, and means for operating said actuating device, substantially as described.

10. In an apparatus of the kind described, the combination of a kettle, a truck supporting it arranged on a track extending into a furnace, whereby the kettle is movable into and out of the furnace, a dome to close the top of the kettle which is suspended above the track, and means for raising and lowering said dome to bring it into and out of engagement with the kettle when the kettle is moved to a position beneath it, means connected with said dome for delivering a solvent to the closed kettle, and mechanical means connected with the dome for stirring said solvent into the contents of the kettle, substantially as described.

11. In an apparatus of the kind described, the combination of a kettle, a truck supporting it arranged on a track extending into a furnace, whereby the kettle is movable into and out of the furnace, a dome to close the top of the kettle suspended above the track, means for raising and lowering said dome to bring it into and out of engagement with the kettle when the kettle is moved to a position beneath it, means connected with said dome for delivering a solvent to the closed kettle, and mechanical means connected with the dome for stirring said solvent into the contents of the kettle, and a condenser connected with the dome for condensing the vaporized solvent, which is constructed and arranged to return the vaporized solvent to the kettle, substantially as described.

12. In an apparatus of the kind described, a portable kettle adapted to be moved into and out of a furnace to boil the contents thereof, means for closing the top of the kettle when removed from the furnace and while the contents thereof is at a high temperature, means for delivering a solvent to the closed kettle, mechanical means for stirring said solvent into the contents of the kettle to dissolve the same, and a condenser connected with said closed kettle for condensing the vaporized solvent and for returning the condensed solvent, substantially as described.

In testimony whereof, I have signed my name to this specification, in the presence of two subscribing witnesses.

GEORGE WESLEY PRIEST.

Witnesses:
B. J. NOYES,
H. B. DAVIS.